June 3, 1941. W. A. AYRES 2,244,235
CYCLORAMIC OPTICAL SYSTEM
Filed Sept. 3, 1938
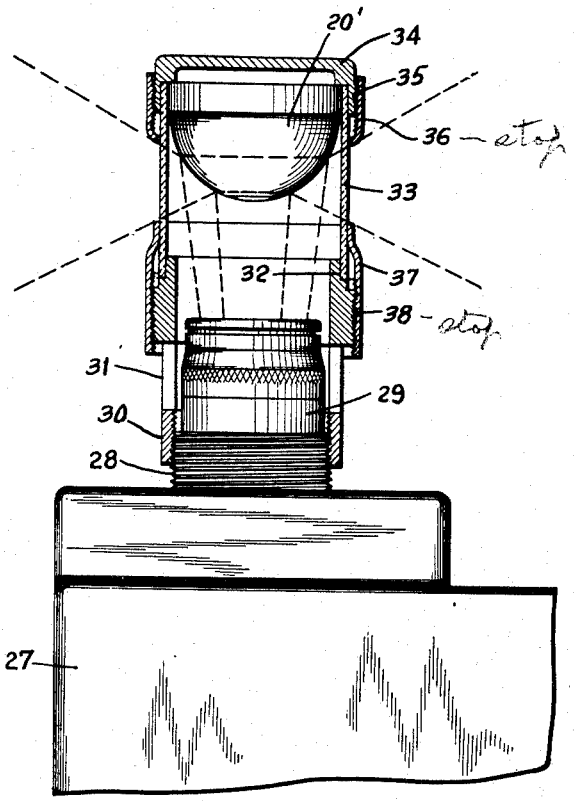
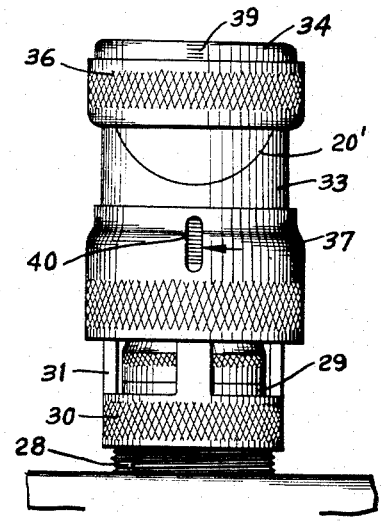
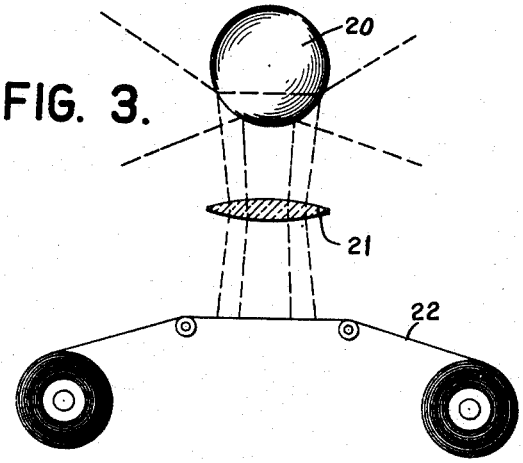
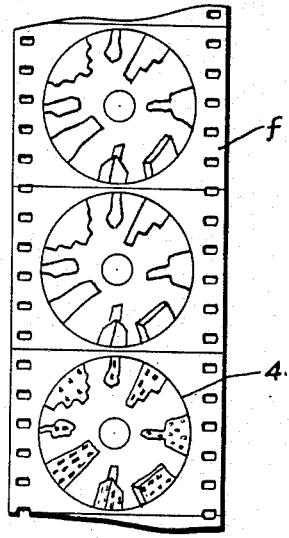
INVENTOR.
Waldemar A. Ayres
BY
W. M. Wilson
ATTORNEY Patented June 3, 1941

2,244,235

UNITED STATES PATENT OFFICE 2,244,235

CYCLORAMIC OPTICAL SYSTEM

Waldemar A. Ayres, New York, N. Y., assignor to International Business Machines Corporation, New York, N. Y., a corporation of New York Application September 3, 1938, Serial No. 228,327

1 Claim. (Cl. 88—69)

This invention relates to improved devices for recording and projecting cycloramic still or moving pictures.

An object of the invention is the provision of a spherical or conical reflector or prism so associated with a camera or projector that pictures of a complete 360° range of vision may be recorded and projected.

Another object of the invention is the provision of calibrated masking devices associated with a cycloramic reflector on a camera or projector to determine adjustably the upper and lower limits of vertical scope of a recorded and projected horizontal band encompassing a complete circular range of light ray reception.

A feature of the invention is the association of periscopic devices with a reflector to adapt it for use with a camera or projector operated in a normal position.

Further and other objects of the present invention will be hereinafter set forth in the accompanying specification and claim and shown in the drawing which shows by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claim.

In the drawing:

Fig. 1 is a sectional elevation view showing the association of a hemispherical reflector with a camera or projector.

Fig. 2 is a side view of the parts shown in Fig. 1.

Fig. 3 is a diagrammatic view of the picture recording devices of the present invention.

Fig. 4 is a portion of moving picture film showing circular representations thereon which may be projected as cycloramic pictures.

Referring to the diagrammatic showing of Fig. 3 it is seen that the recording of a 360° cycloramic picture is made possible by supporting a spherical reflector 20 in front of the lens 21 behind which the film 22 is fed in a camera. The light reflected from all objects in all directions within an appreciable vertical range is reflected from the highly polished sphere 20 down through the lens of the camera against the film which is exposed by the usual shutter mechanism for the required interval of time.

Turning to Fig. 1 it is seen that the camera or projector 27 is provided with a threaded shoulder 28 through which the lens mounting 29 projects. Threaded on this shoulder 28 is the lower circular portion 30 of a standard 31 on which the reflector is mounted. The upper part of standard 31 is formed with a circular shoulder 32 in which is seated the lower end of a transparent cylinder 33 which in its upper end carries a hemispherical reflector 20'. The reflector and cylinder are held together by means of a cap 34 formed with threads 35 around its outer edge. Attached to cap 34 is a cylindrical mask 36 formed with interior threading proportioned to engage the threads 35 on cap 34 so that the mask may be turned by means of knurling thereon, and the mask is lowered or raised with respect to the reflector to vary the range of recording or projecting and limit the upper edge of the image received or sent by means of the reflector.

Another masking cylinder 37 is threaded at 38 to turn on the threaded upper part of standard 31 and to move vertically with relation to the reflector as it is adjusted by hand. This lower mask 37 acts as a lower limiting stop to shut off all undesirable rays of light from the bottom of the picture which is being recorded or projected. Between the two masks 36 and 37 there may be confined the desired range of cycloramic recording or projection.

The cap 34, Fig. 2, is calibrated at 39 with indicating lines cooperating with the upper edge of mask 36 to indicate the position of the mask. In a similar fashion, the lower mask 37 is provided with an indication opening 40 and arrow pointing towards lines marked around the lower part of the cylinder 33 so that a reading may be taken to determine the location of the mask.

It may be noted that the lower part of standard 31 is formed with apertures at the sides through which the fingers may be inserted to adjust the focus of the lens in mounting 29.

The cylinders 33, Figs. 1 and 2, instead of being made of transparent material may be made of ground glass or any other translucent material with a picture retaining surface to reveal a concentrated cycloramic picture directly surrounding the projector.

The reflectors 20 and 20' may be formed as hollow transparent shells with an inner silvering or other reflecting lining, but it is preferred that they be surface finished with the reflecting substance on the outer surface of the reflector. The shape of the surfaces and shells of the reflectors may be corrected for aberration.

Of course, an incomplete cyclorama, or segmental portions thereof, may be recorded and exhibited as well as a complete circular picture.

In Fig. 4 there is shown a strip of moving picture film $f$ on which there is recorded the successive cycloramic images 44 of a street scene. Each image appears as an annular picture, with the objects that were in the 360° range of view, distributed around the outer portion of the image and conveying toward the center of the image. Of course, instead of being recorded on motion picture film, a single image may be recorded on a film or plate of a still camera.

While there has been shown and described and pointed out the fundamental novel features of the invention as applied to a single modification, it will be understood that various omissions and substitutions and changes in the form and details of the devices illustrated and in their operation may be made by those skilled in the art without departing from the spirit of the invention. It is the intention therefore to be limited only as indicated by the scope of the following claim.

What is claimed is as follows:

In a device for recording and projecting a cycloramic image, a threaded mounting around the picture opening of said device, a threaded member screwed on said mounting and rotatable thereon for adjustment, a transparent cylinder the bottom of which is fastened to said member, a hemispherical reflector inverted in the upper end of said cylinder, a round cap on the upper end of the cylinder for holding the reflector in the cylinder, said cap having a threaded portion around the periphery, an upper cylindrical mask threaded on the inside to engage said threaded portion and be adjustable thereon up and down to reveal and obstruct rays of light passing to and from said reflector, an outer threaded ring formed as part of said member, a lower cylindrical mask threaded on the inside to engage said threaded ring and be adjustable thereon up and down to reveal and obstruct rays of light passing to and from said reflector, and gauge markings on said cap and cylinder for regulating the extent of adjustment of said masks.

WALDEMAR A. AYRES.